Dec. 28, 1937.  K. SCHLESINGER  2,103,646
RECEIVING AERIAL FOR ULTRASHORT WAVES
Filed Jan. 7, 1935

Inventor:

Patented Dec. 28, 1937

2,103,646

UNITED STATES PATENT OFFICE 2,103,646

RECEIVING AERIAL FOR ULTRASHORT WAVES

Kurt Schlesinger, Berlin, Germany

Application January 7, 1935, Serial No. 724
In Germany January 9, 1934

9 Claims. (Cl. 250—20)

In order to obtain a good reception when receiving ultra-short waves, i. e., waves between 1 and 10 metres, it has already been proposed to employ aerials, the length of which is equal to the length of the wave to be received or equal to one-quarter of the wave length. It is, however, very difficult with tuned aerials of this nature to obtain a good coupling with the receiver, which operates with a high efficiency.

The subject matter of the invention is a receiving arrangement making use of tuned aerial systems, which permit of good coupling with the receiver in the most simple fashion.

According to the invention, there is employed an aerial which is shorter in length than would correspond with the wave to be received (for example somewhat shorter than one-quarter of the shortest wave length concerned), and is connected with a coil.

In order to permit of proper tuning in simple fashion the coil is preferably constructed as a coil with adjustable inductance.

The coupling is performed inductively, i. e., as current coupling.

Figure 1:
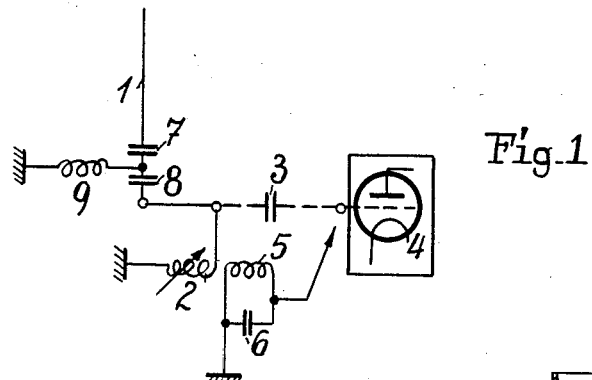
Figure 2:
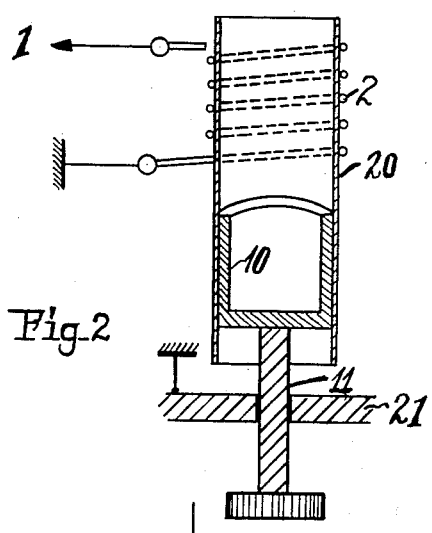
Figure 3:
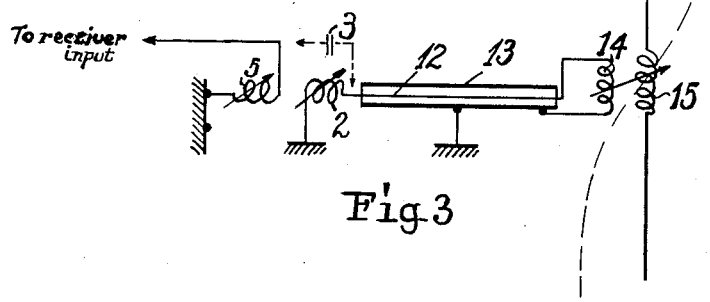

Certain forms of embodiment of the arrangement according to the invention are illustrated in the drawing, in which Fig. 1 is the basic diagram of the arrangement according to the invention, whilst in Fig. 2 there is shown a form of embodiment of the aerial coil according to the invention, and in Fig. 3 an arrangement for those instances in which the connection of an energy line is necessary between the aerial and the receiving apparatus.

A condition for the arrangement according to the invention is the presence of a relatively large metallic surface (for example the base of the receiver), which is to be regarded as adequate earthing for the ultra-short wave. It is in this sense that in the following the "electrical counter-poise" is referred to as earth. It is also assumed that this metallic mass is properly earthed for long waves and low frequencies by means of a special earthing wire. If a counterpoise of this nature is not present in the receiver, the same, in accordance with the invention, must be specially produced. In this connection, as the applicant has found, metallic surface (boxes or discs and the like) with a surface of approximately ½ square meter and disposed freely in space are sufficient in the case of a receiving wave approximately 7 metres in length.

In Fig. 1; 1 is the aerial conductor selected according to the invention, and 2 the coil or variable inductance.

The latter may either be connected capacitatively through the medium of a very small coupling condenser 3 with the input terminal of the receiver 4, for example with the grid of the input stage of the receiver, or it may be coupled inductively with an oscillatory circuit 5, 6, from which the incoming signals are led to the input stage of the receiver. For the purpose of by-passing interfering long waves there may conveniently be employed a high-pass filter 7, 8, 9, the condensers 7 and 8 of which, combined with the smallest occurring values of the inductance 2, are always tuned to longer waves than the ultra-short wave employed, whilst on the other hand the choke 9 represents a short-circuit against the capacity 7 in respect of all long waves received on the aerial. The elements may be dimensioned, for example, as follows:

7 and 8 each $1.1 \times 10^{-3}$ mf.; 9 has approximately 0.01 millihenry (mh.); 2 approximately 0.01–0.04 millihenry.

The variable inductance coil shown in Fig. 2 is furnished with a conductive short-circuit cylinder 10, arranged to be shiftable within the cylinder 20 which holds the single windings of the coil 2.

The adjustment of the resonance condition takes place by introducing continuously the short-circuit cylinder 10 into the cylinder 20 by means of a screw 11, which is supported by a screw nut 21. The cylinder 10 is earthed via this support 21 and also the lower end of the coil 2 is earthed.

The same tuning effect may be accomplished by the series or parallel connection of an inductance 2, with an adjustable capacity (not shown), the valve of the inductance being selected to be larger or smaller than the exact value of the inductance necessary for the desired resonance.

In those cases in which a large spacing is not to be avoided between the receiving aerial and the receiving apparatus there is required the in- intermediate connection of an energy line, as shown in Fig. 3. Therein the connection of the aerial circuit 1 with the energy line 12 having a line-screening means represented by a tube or a parallel wire 13, is also performed by means of an inductive coupling 14, 15 of variable inductance. On the receiver end the energy line may be connected capacitatively or inductively with coil 5 in the manner already described in Fig. 1 by means of a very small condenser 3 or an inductance 2.

The arrangement according to the invention may be employed for all radio reception purposes; the use thereof is particularly convenient, however, in connection with television receiving arrangements.

I claim:

1. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being coupled with a receiving apparatus.

2. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being inductively coupled as current coupling, over an oscillatory circuit with a receiving apparatus.

3. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance capacitatively coupled as voltage coupling with a receiving apparatus, by a very small coupling condenser.

4. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being coupled with a receiving apparatus, in said antenna circuit between said aerial wire and said inductance a condenser-coil-filter for diverting long wave-interference.

5. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being coupled with a receiving apparatus by means of an energy line over a transformer with variable coupling between primary and secondary coil.

6. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being coupled with a receiving apparatus, for tuning said inductance a closely coupled earthed short-circuit conductor being shiftable in the same.

7. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement and an adjustable inductance between said aerial wire and said earthing arrangement for tuning the whole antenna circuit to resonance with said multiple of the wave length to be received, said inductance being coupled with a receiving apparatus, for tuning said inductance a closely coupled earthed short-circuit conductor being shiftable in the same, the lower end of said inductance being earthed.

8. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement, an inductance having a value being smaller than the exact value necessary for the desired resonance and a variable condenser parallel to said inductance between said aerial wire and said earthing arrangement for tuning the whole antenna circuit to resonance with said multiple of the wave length to be received, said inductance being coupled with a receiving apparatus.

9. In an ultra-short wave receiver an antenna circuit being equivalent to an aerial wire the length of which is one-quarter or a multiple of one quarter of the received wave length, said antenna circuit consisting of an aerial wire being a little shorter than said multiple of one quarter of the received wave length, an adequate earthing arrangement, an inductance having a value being larger than the exact value necessary for the desired resonance, and a variable condenser in series connection between said aerial wire and said earthing arrangement for tuning the whole antenna circuit to resonance with said multiple of the wave length to be received, said inductance being coupled with a receiving apparatus.

KURT SCHLESINGER.